US010289735B2

(12) United States Patent
White et al.

(10) Patent No.: US 10,289,735 B2
(45) Date of Patent: May 14, 2019

(54) ESTABLISHING SEARCH RESULTS AND DEEPLINKS USING TRAILS

(75) Inventors: Ryen W. White, Woodinville, WA (US); Peter Bailey, Kirkland, WA (US); Nikhil Dandekar, Bellevue, WA (US); Adish Singla, Seattle, WA (US); Jeff Huang, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 899 days.

(21) Appl. No.: 12/768,172

(22) Filed: Apr. 27, 2010

(65) Prior Publication Data

US 2011/0264673 A1    Oct. 27, 2011

(51) Int. Cl.
*G06F 17/30* (2006.01)

(52) U.S. Cl.
CPC .............. *G06F 17/30867* (2013.01)

(58) Field of Classification Search
USPC .................................. 707/750–755
See application file for complete search history.

(56) References Cited

U.S. PATENT DOCUMENTS

| 7,631,007 B2 | 12/2009 | Morris | |
| 8,117,075 B1* | 2/2012 | Linden | G06Q 30/00 705/26.1 |
| 8,145,636 B1* | 3/2012 | Jeh | G06F 17/30707 707/736 |
| 8,180,778 B1* | 5/2012 | Pedersen | G06F 17/3089 707/739 |
| 8,255,413 B2* | 8/2012 | Bennett | G06F 17/30867 707/766 |

(Continued)

FOREIGN PATENT DOCUMENTS

| GB | 2357596 A | * | 6/2001 | ....... G06F 17/30873 |
| WO | WO2001046828 A2 | * | 12/2000 | ......... G06F 2216/07 |
| WO | WO 0146828 A2 | * | 6/2001 | ....... G06F 17/30873 |

OTHER PUBLICATIONS

Bilenko, M., R. W. White, Mining the search trails of surfing crowds: identifying relevant websites from user activity, Proc. of the 17th Int'l Conf. on World Wide Web, Apr. 2008, pp. 51-60, Beijing, China.

(Continued)

*Primary Examiner* — Mark D Featherstone
*Assistant Examiner* — Navneet Gmahl
(74) *Attorney, Agent, or Firm* — Alleman Hall Creasman & Tuttle LLP

(57) ABSTRACT

Search and browse trails are temporally-ordered sequences of web pages visited by a user during post-search query navigation beginning with a page associated with one of the search results. The trails can provide useful information for a number of search-related purposes. For example, these trails can be used to leverage the post-query behavior of other users to help the current user search more effectively and allow them to make more informed search interaction decisions. The trails can also be used to establish search results and refine search result rankings, select and evaluate deeplinks, and recommend multi-step trails as an alternative to or enhancement for existing search result presentation techniques.

20 Claims, 5 Drawing Sheets

(56) References Cited

U.S. PATENT DOCUMENTS

| | | | | |
|---|---|---|---|---|
| 8,572,100 B2* | 10/2013 | Hamilton | | G06F 17/30864 707/750 |
| 8,589,395 B2* | 11/2013 | Singh | | G06F 17/30864 704/9 |
| 2002/0099685 A1* | 7/2002 | Takano | | G06F 17/30011 |
| 2002/0184186 A1* | 12/2002 | Imaichi | | G06F 17/30011 |
| 2004/0093323 A1* | 5/2004 | Bluhm | | G06F 17/30011 |
| 2005/0125376 A1* | 6/2005 | Curtis | | G06F 17/30867 |
| 2005/0132296 A1* | 6/2005 | Milic-Frayling | | G06F 17/30873 715/745 |
| 2007/0156677 A1* | 7/2007 | Szabo | | 707/5 |
| 2007/0299885 A1* | 12/2007 | Pareek | | G06F 17/30563 |
| 2008/0281817 A1* | 11/2008 | White | | G06F 17/30867 |
| 2008/0306937 A1* | 12/2008 | Whilte | | G06F 17/30899 |
| 2008/0319976 A1 | 12/2008 | Morris | | |
| 2009/0112781 A1 | 4/2009 | Heath | | |
| 2009/0119268 A1* | 5/2009 | Bandaru et al. | | 707/3 |
| 2009/0204599 A1 | 8/2009 | Morris | | |
| 2009/0248661 A1* | 10/2009 | Bilenko | | G06F 17/30864 |
| 2009/0265347 A1 | 10/2009 | Reed | | |
| 2010/0332583 A1* | 12/2010 | Szabo | | 709/202 |
| 2011/0202522 A1* | 8/2011 | Ciemiewicz | | G06F 17/30867 707/711 |

OTHER PUBLICATIONS

White, R. W., M. Bilenko, S. Cucerzan, Studying the use of popular destinations to enhance web search interaction, Proc. of the 30th Annual Int'l ACM SIGIR Conf. on Research and Development in Info. Retrieval, Jul. 2007, pp. 159-166, Amsterdam, The Netherlands.

White, R. W., S. M. Drucker, Investigating behavioral variability in web search, Proc. of the 16th Int'l Conf. on World Wide Web, May 2007, pp. 21-30, Banff, Alberta, Canada.

* cited by examiner

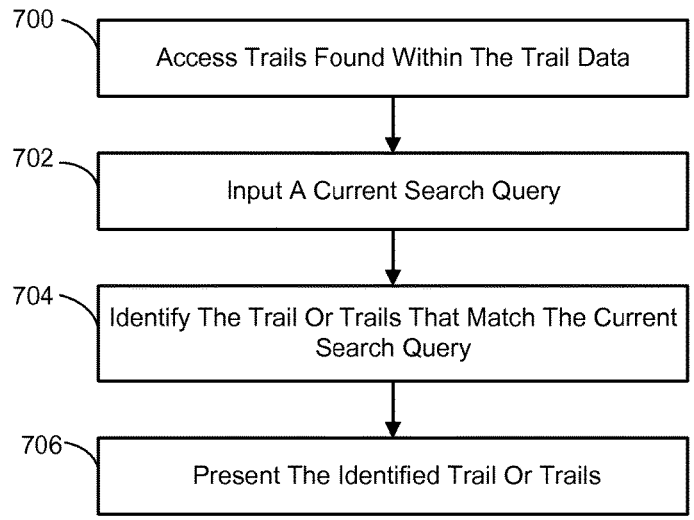

FIG. 7

Microsoft Office 2010 - Wikipedia, the free encyclopedia
Microsoft Office 2010, codenamed Office 14, is the successor of Microsoft Office 2007, a productivity suite for Microsoft Windows. [1] Office 2010 includes extended file ...
http://en.wikipedia.org/wiki/Microsoft_Office_2010 → http://en.wikipedia.org/wiki/Microsoft_Excel → http://en.wikipedia.org/wiki/Office_2007 → http://en.wikipedia.org/wiki/Graphical_User_Interface → http://en.wikipedia.org/wiki/Ribbon_(computing) → http://en.wikipedia.org/wiki/Tab_(GUI) → http://en.wikipedia.org/wiki/Original_Equipment_Manufacturer → http://www.wisegeek.com/what-is-oem.htm → http://en.wikipedia.org/wiki/Speech_Recognition

FIG. 8

ESTABLISHING SEARCH RESULTS AND DEEPLINKS USING TRAILS

BACKGROUND

In response to a query, search engines return a ranked list of search results. Unless the user is searching for something likely to appear as an instant answer on the search engine result page (the "SERP"), such as a stock quote or the result of a mathematical calculation, these search results are the starting point for post-query navigation. This navigation typically involves a user deciding which search result to click on, and then deciding about which pages to subsequently visit and in what sequence. The sequence of pages visited by a user during the post-query navigation can be referred to as a search and browse trail.

SUMMARY

This Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

Search and browse trails are temporally-ordered sequences of web pages visited by a user during post-search query navigation beginning with a page associated with one of the search results. The trails provide useful information for a number of search-related purposes. For example, trails can be employed to establish search results. More particularly, in one embodiment, establishing search results based in part on trail data is accomplished by first accessing trails found within the trail data. One or more trails that match a current search query to a prescribed degree are then identified. The identified trail or trails are employed to select one or more URLs found therein for inclusion (or potential inclusion) in the search results found by a search engine in response to the current search query, hence potentially boosting the engine's result recall in addition to result precision. The identified trail or trails can also be used increase the rank of a URL already present in the search results in a re-ranking operation. Search and browse trails can also be presented to users on SERPs as an alternative or enhancement to existing search result presentation techniques.

Further, trails can be employed to select deeplinks within a search result site that can be presented to a user as navigational shortcuts. More particularly, in one embodiment establishing a set of one or more deeplinks for a search result using trail data is accomplished by first accessing navigational trails within the trail data. A time to destination is then computed for each of the accessed navigational trails, and a total time to destination is computed for each group of navigational trails ending in the same destination URL. The computed total times to destination are then employed to establish the set of deeplinks for the search result.

DESCRIPTION OF THE DRAWINGS

The specific features, aspects, and advantages of the disclosure will become better understood with regard to the following description, appended claims, and accompanying drawings where:

FIG. 7 is a flow diagram generally outlining one embodiment of a process for matching trails to a search query and presenting the trails.

FIG. 8 is a diagram depicting an example of a trail presentation on a SERP.

DETAILED DESCRIPTION

In the following description of embodiments for establishing search results and deeplinks using search and browse trails reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Search and Browse Trails

Search and browse trails (trails for short) are temporally-ordered sequences of web pages visited by a single user during the aforementioned post-query navigation. Pages on the trails are linked by actions including, but not limited to, hyperlink clicks, typing a URL in the browser address bar, clicking on a browser/toolbar button, and so on. One specialized example of this is a click trail. Click trails are search and browse trails where there is a hyperlink click between each of the URLs on the trail. In some cases, this can filter out erroneous URLs that may not be associated with the originating query. Trails can terminate after a prescribed period of inactivity (e.g., a 30 minute inactivity timeout); or by any other event that suggest an end to the active task, such as returning to a homepage or visiting social networking/web email sites. In addition, trails can be deemed terminated on the next search engine query. However, this need not be the case. Multi-query trails can be noisy but can also be more valuable to users. Search and browse trails can be extracted from a variety of sources. For example, trails can be extracted from search engine query/click logs, toolbar logs, or web browser logs. Trails could also be extracted from website proxy logs or web browser/extension logs, among other sources.

The extracted search and browse trails can provide useful information for a number of search-related purposes that would enhance the search experience for search engine users. In general, these trails can be used to leverage the post-query behavior of other users to help the current user search more effectively and allow them to make more informed search interaction decisions. For example, the trails can be used to establish search results, refine search result ranking in search engines, select and evaluate deep links for presentation on the SERP, and recommend multi-step trails on the SERP as an alternative to or enhancement for existing search result presentation techniques. Showing complete trails on the SERP can help users complete multi-step tasks and provide awareness about what other users do following selection of a search result.

1.1 Establishing Search Results and Deeplinks Using Trails

Figure 1:
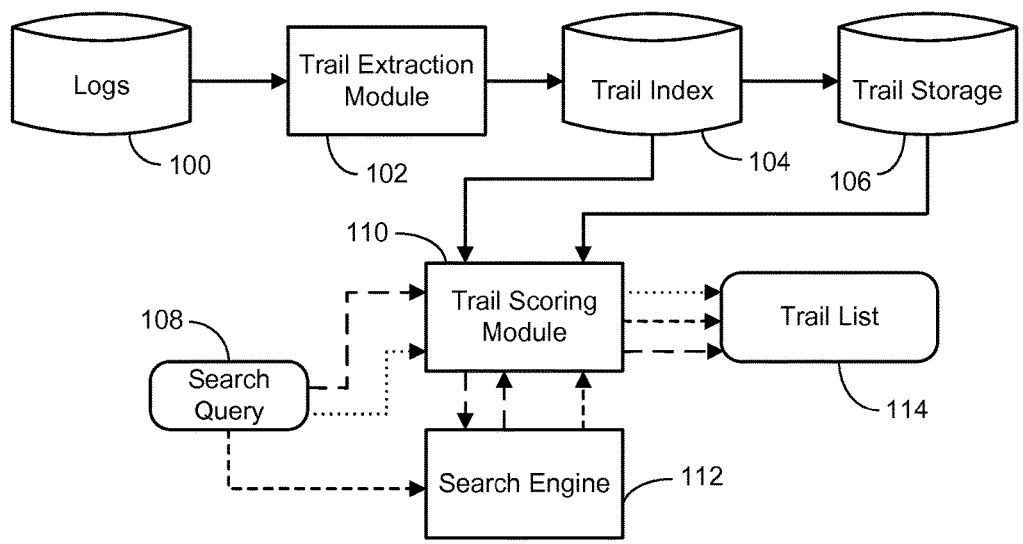
FIG. 1 is a simplified architectural diagram that can be used to establish search results or deeplinks using search and browse trails.

Before embodiments for establishing search results or deeplinks using search and browse trails are described, a general description of a suitable implementing architecture will be provided. FIG. 1 shows one exemplary embodiment of such a suitable architecture.

As indicated previously, raw navigational data is obtained from various logs 100, such as from search engine query/click logs, toolbar logs, or web browser logs. Trails are extracted from the log data using conventional methods by a trail extraction module 102. The extracted trails are then indexed and the index information stored in a trail index 104. The trails themselves are stored in any appropriate storage vehicle 106.

When a user enters a search query 108, in one implementation it is presented to a trail scoring module 110. The query 108 is then passed to a search engine 112, which produces a ranked list of search results based on the query. The search results (or a prescribed number of the top ranking results) are then provided to the trail scoring module 110. This implementation is indicated by the dashed line arrows with the longer dashes in FIG. 1. In another implementation, the query 108 is presented directly to the search engine 112, and then the query and search results (or a prescribed number thereof) are provided to the trail scoring module 110. This implementation is shown using the dashed line arrows with the shorter dashes in FIG. 1. In yet another implementation, the query 108 is presented directly to the trail scoring module 110 and is not provided to the search engine 112. This implementation is shown using the dotted line arrows in FIG. 1.

In all of the foregoing implementations the ultimate result of a user inputting a query 108 is the output by the trail scoring module 110 of a list 114 of one or more trails. In the cases where the search engine 112 is involved in producing a ranked list of search results, the list 114 includes a matching trail or trails for each of the result items presented. In the case where the search engine is bypassed, the list 114 includes one or more trails representing matching trails for the query. The determination as to whether a trail matches a search query or a search result will be described in a later section. It is noted that the trail scoring module 110 has access to the trail index 104, and the trail storage 106, in order to compute the scoring and provide the one or more matching trails. As will also be described in more detail later, the trails in list 114 can provide useful information for a number of search-related purposes. For example, these trails can be used to leverage the post-query behavior of other users to help the current user search more effectively and allow them to make more informed search interaction decisions. The trails can also be used to establish search results and refine search result rankings, select and evaluate deeplinks, and recommend multi-step trails as an alternative to or enhancement for existing search result presentation techniques.

1.1.1 Using Trails in Establishing Search Results

Search and browse trails provide insight into user behavior once users leave the SERP. When many trails followed by prior users from the results of prior searches are used, this information can be a valuable factor in establishing search results and ranking of web pages in those embodiments involving a search engine. For example, trails can be used to refine the search result precision (i.e., the proportion of retrieved results that are relevant) and the search result recall (i.e., the proportion of relevant results that are retrieved) of the search results produced by a search engine.

Figure 2:
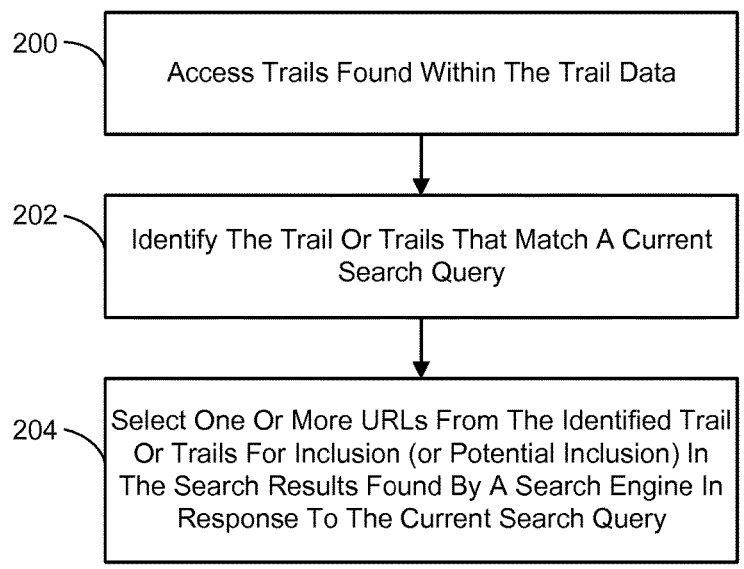
FIG. 2 is a flow diagram generally outlining one embodiment of a process for establishing search results based in part on search and browse trail data.

In one embodiment, establishing search results based in part on search and browse trail data is accomplished as follows. Referring to FIG. 2, trails found within the trail data are first accessed (200). Next, the trail or trails that match a current search query to a prescribed degree are identified (202). The identified trail or trails are then employed to select one or more URLs found therein for inclusion (or potential inclusion) in the search results found by a search engine in response to the current search query (204).

In one implementation, one or more URLs in the identified trails are selected to be included in the search results and simply added to the provided results with an arbitrary rank (e.g., the top ranking results). The factors used to determine if a trail URL is worthy of inclusion in the search results will be described shortly.

In an alternate implementation, the URLs in the identified trails that are selected for inclusion in the search results are not directly added, but instead are subjected along with the other search results to a re-ranking operation (which can employ the search engine's ranking scheme) and included in the revised search results if ranked high enough. One way of boosting the rank of a URL that is selected for inclusion based on trails is to add the original query to the URL title or its URL string, or both, of the URL, and then re-rank the results. This can be very effective technique to solve ranking issues where a relevant document is missing a concept (e.g., one of the query words) and hence is not ranked highly by the search engine. It is noted that the URLs selected for inclusion in the search results need not be URLs that are missing from the search results, but can also be URLs associated with a result that already exists in the search results. In this latter case, the inclusion of these already existing URLs could increase the rank of the result in the re-ranking operation.

One factor in determining if a URL is worthy of inclusion in the search results is the number of times a URL is "clicked on" (i.e., the click count) in the identified trails. If a URL's click count exceeds a prescribed count threshold (e.g., a threshold of 5 or 10 clicks has been found to work well), it is deemed worthy of inclusion. However, for low frequency queries, logs do not provide sufficient click data to use click count. Such rare queries account for 80-90% of unique queries appearing in logs. Thus, relevant URLs might be overlooked. User engagement provides a way to associate quality to a clicked URL and remove noisy clicks which are irrelevant to original query. More particularly, user engagement features such as trail size, breadth, maximum dwell time among nodes in the trails, and so on, can be used to boost original clicked web pages previously not considered for ranking.

Examples of URLs other than those deemed to have a high enough click count that could be considered worthy of inclusion in the search results include: the first URL in the trail; or the last URL in the trail; or the URL inside a trail on which a prior user associated with the trail spent the maximum amount of time; or a URL inside a trail on which a prior user associated with the trail spent an amount of time equaling or exceeding a threshold (e.g., dwells on page for more than 30 seconds have been shown to be indicative of user satisfaction); or any combination of these URLs. Further, various other features that are associated with URLs in trails can be employed to select, or not select, a URL in a trail for inclusion (or potential inclusion) in the presented search results. For instance, whether a URL in the trail is an intra-domain URL versus a cross-domain URL can have significance. In particular, a URL in a trail that is outside the domain of the first URL in the trail can indicate a new source of potentially-relevant information and so would be deemed worthy of inclusion. The depth and breadth of a URL within a graph representation of the trail is another feature that can have significance. A user might also switch context while browsing trails (especially for deep trails), which needs to be detected to avoid adding irrelevant URLs to the search results. One way of accomplishing this is to ascertain if at least one of the query terms of the search query associated with the trail is found in the URL's title or its URL string. If so, then it is likely that the context has not switched. If not, then a context switch can be suspected and the URL would not be deemed worthy of inclusion.

1.1.2 Using Trails to Select and Measure Deeplinks

Figure 3:
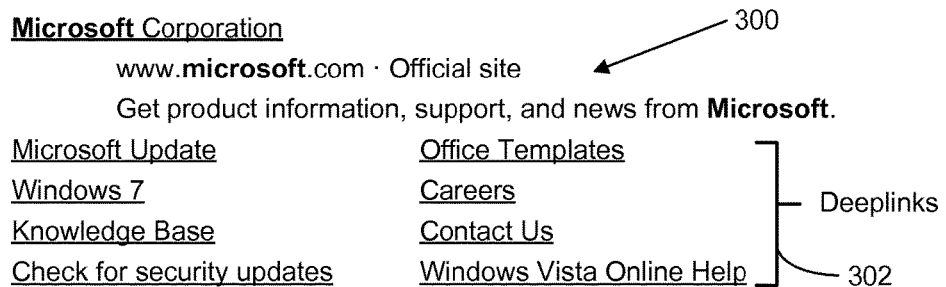
FIG. 3 is a diagram depicting an example of a set of deeplinks displayed beneath a search result.

Search engines sometimes support navigational queries by not only offering the ranked search results in the SERP, but also by providing so-called "deeplinks" for one or more of the result URLs that provide users with single-click access to popular pages (referred to as destination URLs) within a search result domain. An example of these deeplinks 302 for a search result site 300 is shown in FIG. 3.

1.1.2.1 Selecting Deeplinks

Search and browse trails can be employed to select deeplinks within a search result domain that can be presented to a user in the SERP. More particularly, navigational browser trails can be employed for this purpose. A navigational browser trail is a sequence of URLs which a user (u) visits, starting with a navigational URL (n) and ending at a destination URL (d), while staying in the same domain throughout. In one implementation, the destination URL d is defined as any URL for which the dwell time is greater than 30 seconds. However, other prescribed dwell times can also be used or even dwell time ranges.

As an example where d=30 seconds, consider a user who selects an initial site, such as one listed in the search results in the SERP, and dwells there for 5 seconds, then goes to a page in the same domain and dwells there for 15 seconds. Then, assume this pattern of going to another page in the same domain is repeated twice more with the user dwelling for 10 seconds at the third page and 120 seconds at the fourth page. In this example, the first page would be the navigational URL, and the fourth page's URL would be deemed to be a destination URL since the dwell time was greater than 30 seconds.

Given a navigational browser trail as described above, a time to destination $t_u(n, d)$ can be defined as the total time needed for the user to reach the destination URL from the navigational URL. In the foregoing example, $t_u(n, d)=5+15+10=30$ seconds.

It is noted that a navigational trail can end as soon as the first destination URL is reached, or it can continue as long as the user stays in the current domain. In this latter case, in one implementation, each intermediate destination URL will be assigned a prescribed period of time corresponding to the minimum amount of time needed for the URL to be considered a destination URL (e.g., 30 seconds), even if the actual dwell time was longer. This is done for the purpose of computing the time to destination to a subsequent destination URL. For example, consider the scenario where a user selects an initial site and dwells there for 5 seconds, then goes to a page in the same domain and dwells there for 15 seconds. Then, assume this pattern of going to another page in the same domain is repeated four more with the user dwelling at each page in turn for 10 seconds, 120 seconds, 10 seconds and 300 seconds. In this example there are 2 destination URLs $d_1$ and $d_2$ with corresponding times to destination of: $t_u(n, d_1)=5+15+10=30$ seconds for the fourth page, and $t_u(n, d_2)=5+15+10+30+10=60$ seconds for the last page. Thus, the effective dwell time of an intermediate destination URL is the prescribed period of time corresponding to the minimum amount of time needed for the URL to be considered a destination URL (30 seconds in this example), rather than the actual dwell time (120 seconds in this example).

Next, a total time to destination is defined as the sum of the destination times over all the users who started at the navigational URL n, and have the destination URL d, irrespective of the actual trail taken. Thus, $$t(n,d)=\Sigma_u t_u(n,d). \qquad (1)$$

Further, $t(n, d)$ can also be written as:

$$t(n, d) = \frac{\sum_u t_u(n, d)}{|U|} * |U|, \qquad (2)$$

Where $|U|$ is the number of users who go from n to d. In other words, $t(n, d)$ equals the average time taken from n to d by the users who go from n to d multiplied by the total number of users who go from n to d.

As indicated previously, some search engines currently include deeplinks in the SERP. As such when a user selects a deeplink directly from the SERP, instead of clicking on the navigational URL and following a trail, the resulting logs will reflect the shortcut. If logs are used to select the deeplink candidates, and the aforementioned deeplink clicks shortcuts are ignored, the resulting $t(n, d)$ for deeplink URLs will be adversely affected since the number of users $|U|$ who go from n to d will be less for deeplink URLs as compared to non-deeplink URLs. For example, consider two deeplink candidates: deeplink A and deeplink B. Say deeplink A is shown as a deeplink in the search results of a query, while deeplink B is not shown. Since a certain percentage of people can directly go to deeplink A from the SERP, instead of clicking on the associated search result URL and navigating to deeplink A, the total number of users who go from the search result URL to deeplink A using navigational browser trails will be comparatively less than that for deeplink B for which there is no deeplink shortcut available. This skew in the number of users following navigational trails to deeplink A would adversely affect the total time to destination $t(n, d)$ of deeplink A.

It is possible to account for the foregoing deeplink shortcut circumstance in the calculation of $t(n, d)$ by modifying the Eq. (2) in the following way:

$$t(n, d) = \frac{\sum_u t_u(n, d)}{|U_T|} * (|U_T| + |U_D|). \qquad (3)$$

In Eq. (3), $|U_T|$ is the number of users who go from n to d via a navigational trail and $|U_D|$ is the number of users who go from n to d via a deeplink click. Thus, $t(n, d)$ is now defined as the average time taken from n to d by the users who go from n to d via a navigational trail, multiplied by the sum of the number of users who go from n to d via a navigational trail and the number of users who go from n to d via a deeplink click. In other words, it is assumed that for all the times a user clicked on the deeplink URL directly from the SERP, had the deeplink shortcut not been available, that user would have taken the same average time to get there as computed for a navigational trail.

Eqs. (1)-(3) can be used for the selection of deeplinks for a search result. In one implementation, this is accomplished by designating the destination URL d, in each group of navigational trails whose sequence of URLs ends in that destination URL, as a deeplink if that group's total time to destination t(n, d) exceeds a prescribed deeplink threshold. In another implementation, the selection of deeplinks for a search result is accomplished by designating a prescribed number of the destination URLs whose groups of navigational trails have the highest total times to destination. Further, in yet another implementation a combination of the foregoing two implementations can be employed where the selection of deeplinks for a search result involves designating the destination URL, in each group of navigational trails whose sequence of URLs ends in that destination URL, as a deeplink if that group's total time to destination t(n, d) exceeds a prescribed deeplink threshold, up to a prescribed number of URLs.

Figure 4:
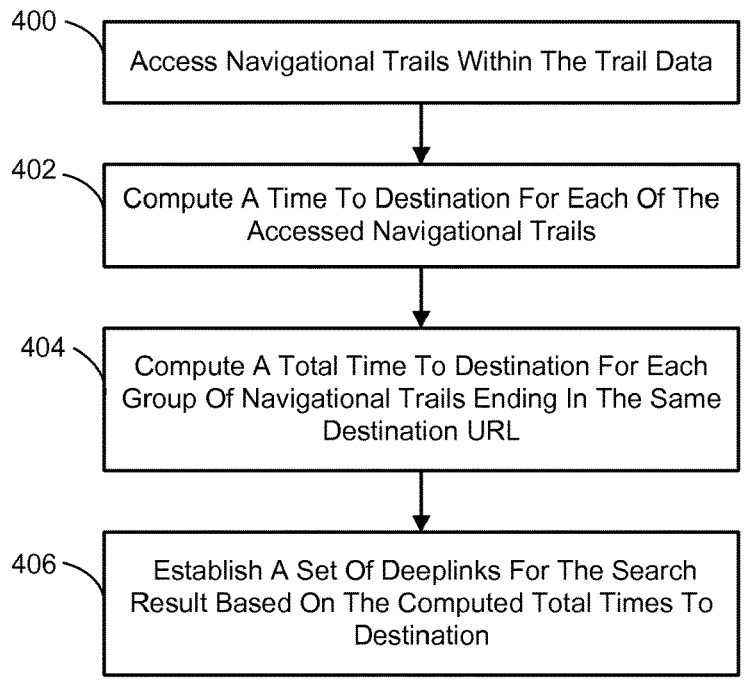
FIG. 4 is a flow diagram generally outlining one embodiment of a process for establishing a set of one or more deeplinks for a search result using search and browse trail data.

In view of the foregoing, one embodiment for implementing the establishment of a set of one or more deeplinks for a search result using trail data is shown in FIG. 4. First, navigational trails within the trail data are accessed (400). As described previously, each navigational trail is a sequence of URLs in the same domain which a prior user visited, starting with a first navigational URL corresponding to the search result and ending at a destination URL. A time to destination is next computed for each of the accessed navigational trails (402). As indicated previously, the time to destination is defined as the sum of an effective time the prior user associated with the navigational trail dwelled on each URL in the sequence of URLs preceding the destination URL. A total time to destination for each group of navigational trails ending in the same destination URL is then computed (404). In one implementation, the total time to destination for each group is defined as the sum of the time to destination computed for each of the navigational trails making up the group. The computed total times to destination are then employed to establish the set of deeplinks for the search result (406).

It is noted that in another implementation of the foregoing embodiment, as indicated in Eq. (3), computing the total time to destination for a group further includes dividing the sum of the times to destination computed for each of the navigational trails in the group by the number of prior users who navigated via a plurality of URLs from the first navigational URL to the destination URL associated with the group. This quotient is then multiplied by the sum of the number of these prior users and a number of prior users who employed a deeplink associated with the search result to reach the destination URL associated with the group.

It is further noted that once a set of deeplinks is established for a search result, the deeplinks could be sorted based on the total time to destination or based on trail information such as the sequence in which deeplinks were typically visited in post-query trails and displayed in that order.

1.1.2.2 Measuring Deeplinks

The foregoing total time to destination t(n, d) can also be used as a way to quantitatively measure and evaluate a set of deeplinks. Given a set of deeplinks for a navigational URL n, in one implementation, a score s(n) for the set is the sum of the total time to destination for all the deeplinks for the URL. Thus, $$s(n)=\Sigma_d t(n,d). \quad (4)$$

A final score s is defined as the sum of scores for all navigational URLs that have a deeplink. Thus, $$s=\Sigma_n s(n) \quad (5)$$

Given Eq. (5), it is possible to compare two or more candidate sets of deeplinks by simply the comparing their s values. If the s value of a candidate set of deeplinks is larger than another candidate set, then the candidate set having the larger s value is deemed to be superior to the other set. This assumes that the number of deeplinks in each candidate set is constrained to be the same. If the number of deeplinks in the candidate sets being compared varies, then the s value is normalized prior to the comparison.

It is noted however that in comparing candidate sets of deeplinks in the foregoing manner, the actual distribution of the s(n) values is not taken into account. It is possible that extreme s(n) values could adversely affect the final scores. The effect of these scenarios can be somewhat mitigated in an alternate implementation by ignoring the actual values of s (n), and using binary scores per URL instead. To this end, a score of 1 is assigned to a set of deeplinks if they have an s(n) value larger than another set of deeplinks to which the first set is being compared. Otherwise, the first set of deeplinks is assigned a score of −1. The final score is then the sum of the binary scores, over all navigational URLs that have a deeplink.

It would be even better if the binary scores are weighted by their popularity (e.g., popularity of either the navigational URL in the toolbar logs or the navigational query in the Query-Click logs). Thus, in a weighted binary scheme, $$b(n)=1 \text{ if } s(n)>s'(n), \text{ else } -1, \text{ and} \quad (6)$$

$$s=\Sigma_n b(n)*p(n), \quad (7)$$

where b(n) is binary score of a set of deeplinks for a navigational URL n and p(n) is the popularity measure for n. A positive s value will indicate that the new set of deeplinks is better than the old. It is also noted that confidence intervals can be used to determine if the differences are significant.

1.1.3 Matching Trails to a Query-URL Pair

This section focuses on selecting one or more trails that best match a query issued to a search engine and a URL associated with one of the search results. The task can be defined as given a query Q and result R, find the trails p with the greatest scores Score(p). In one simple implementation, the most frequent trails users took from the result R are identified and scored highly. However, frequent trails are typically also short, and may not provide users with much insight. Accordingly, in an alternate implementation, let $\{t_1, t_2, \ldots\}$ be terms in Q, and for each $t_n$, score all trails p occurring from a prior query term-search result pair $t_n \times R$:

$$\text{Score}(p) = \sum_{t \in Q} \frac{F(t, R, p) \times \text{Log}[L(p)] \times \text{Log}[V(p)]}{\text{Log}[D(p)]} \quad (8)$$

where F(t, R, p) is the frequency of p following a query containing term t and click on search result R, L(p) is the length of the trail, D(t) is the document frequency of t, V(p) is the domain diversity. This implementation has the advantage of up-weighting long and diverse trails. Since this approach weights trails based on query terms not the full user query, it has the additional advantage of being able to score trails for queries that do not appear in log data. A simpler variant that only includes trails beginning with the exact query Q and a visit to the result R could also be used.

In trails where the path backtracks to previously viewed URLs before moving on (which is frequent occurrence), there are a number of alternate trail selection criteria that can be used, and Eq. (8) can be adapted accordingly. Such backtracking trails are best represented by a tree structure or directed graph, although other representation are also possible such as string sequences and linked lists. When the trails are represented in other than a linear fashion, selection criteria other than just frequency become feasible. Possible trail selection criteria include, but are not limited to:

1. Size—This refers to the number of URLs in the tree or graph. Using size as a criteria provides trails which are likely to have been most engaging for some users in terms of browsing activity spent by them for their task;

2. Strength—This refers to scoring trails based on two things: (i) the engaging potential of the tree or graph in terms of size, and (ii) the ease of navigation. Using strength as a criteria helps to retrieve long trails which can engage users in significant browsing activity (e.g., each instance of trail tree's parent→child is a high probability event conditioned on the parent node, based on browsing activity of many users);

3. Trail breadth—This refers to the number of branches in the tree or graph beginning with the first non-SERP URL in the trail. Using trail breadth as a criteria helps users explore various sub-topics while keeping the overall concept the same (e.g., users might look for specific e-cards within an e-card website);

4. Trail depth—This refers to the maximum number of nodes on a single branch of the tree or graph beginning with the first non-SERP URL in the trail. Using trail depth as a criteria can take a user to new concepts;

5. Out of domain frequency—This refers to the number of URLs in the tree or graph that are outside the domain of the first URL corresponding to the search result. Using out of domain frequency as a criteria finds trails that provide new information relative to the first non-SERP URL in the trail; and 6. Title-URL string matching—This refers to finding trail URLs whose title or URL string include at least one query term. Using this matching as a criterion can force the selection of trails which are of same topic as the query.

With consideration of the foregoing additional trail selection criteria, the following equation can be used to generate a score for each trail:

$$\text{Score}(p) = \sum_{t \in Q} \frac{(1 + F(t, R)) \times \text{weight}(p, t, R)}{\text{Log}[1 + D(t)]}, \quad (9)$$

where $F(t, R)$ is the term-document frequency of $<t, R>$, $D(t)$ is the document frequency of $t$, weight$(p, t, R)$ [selection criteria] depends upon the trail selection criteria. For example, for frequency-based selection, weight$(p, t, R)$ is the frequency of $<p, t, R>$. For size-based selection, weight $(p, t, R)$ can simply be the number of non-SERP URLs in p. For breadth-based selection, weight$(p, t, R)$ can simply be simply the breadth of p. For depth-based selection, weight$(p, t, R)$ can simply be the maximum number of URLs on a single branch of p. And so on for the other trail scoring methods described in this subsection.

Note that in a similar way to as noted for Eq. (8), a variant of Eq. (9) can also be developed where the full-text of the query is used for the trail scoring rather than the term-based matching depicted in Eq. (9). If such a full-query scheme was used, only trails originating with the exact user query would be considered in trail scoring.

Further, the scoring function could be modified to maximize relevance, coverage, diversity, novelty, and utility in the shortest number of steps. These measures can be estimated based on human judgments or empirical analysis of log data, search results, or other similar sources such as web directories like the Open Directory Project (ODP, dmoz.org). For example, relevance can be based on human judgments of the query relevance of trail pages; topic coverage can estimate the extent to which a trail covers the main themes of a query; topic diversity can be estimate many of those distinct query themes are covered; novelty can estimate the amount of new information with respect to the prior knowledge of the user, and utility can measure how useful the pages on the trail appear to be (e.g., whether users dwell for significant amounts of time on the pages). Many of these estimates can be based on the URLs or less-noisy abstractions of the URLs such as ODP classes. These and similar criteria can be used to evaluate trails selected by the trail scoring algorithms or used as part of the algorithm to score trails. One way this can be accomplished is by normalizing these estimates for each trail by the number of URLs in the trail. This allows computing per-URL gain and in one implementation select trails with maximal gain.

In addition, sub-trails can be considered as well as full trails as an additional source of evidence for a trail being worthy of selection. Although a particular full trail may not be followed frequently, sub-trails within that trail may occur often and hence boost the score of the infrequent long trail. For example, if the trail A B C D E F G occurs only once, but A B C and A B D G occur many times, then those sub-trail frequencies should boost the score of the long trail and increase its likelihood of being retrieved.

Figure 5:
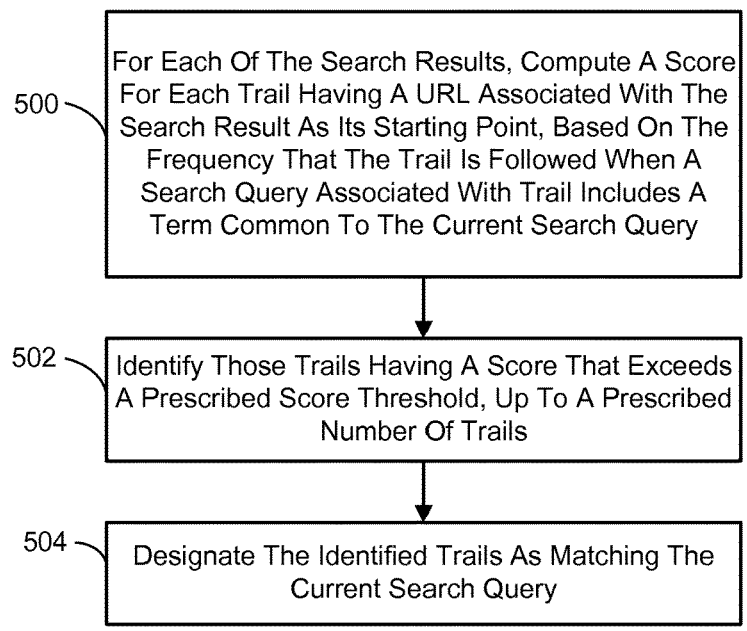
FIG. 5 is a flow diagram generally outlining one embodiment of a process for identifying one or more trails that match a current search query to a prescribed degree.

In view of the foregoing, one embodiment for implementing the identification of one or more trails that match the current search query to a prescribed degree is shown in FIG. 5. First, for each of the search results, a score is computed for each trail having a URL associated with the search result under consideration as its starting point based on the frequency that the trail is followed when a search query associated with trail includes a term common to the current search query (500). Those trails having a score that exceeds a prescribed score threshold up to a prescribed number of trails are then identified (502), and designated as matching the current search query (504).

Figure 6:
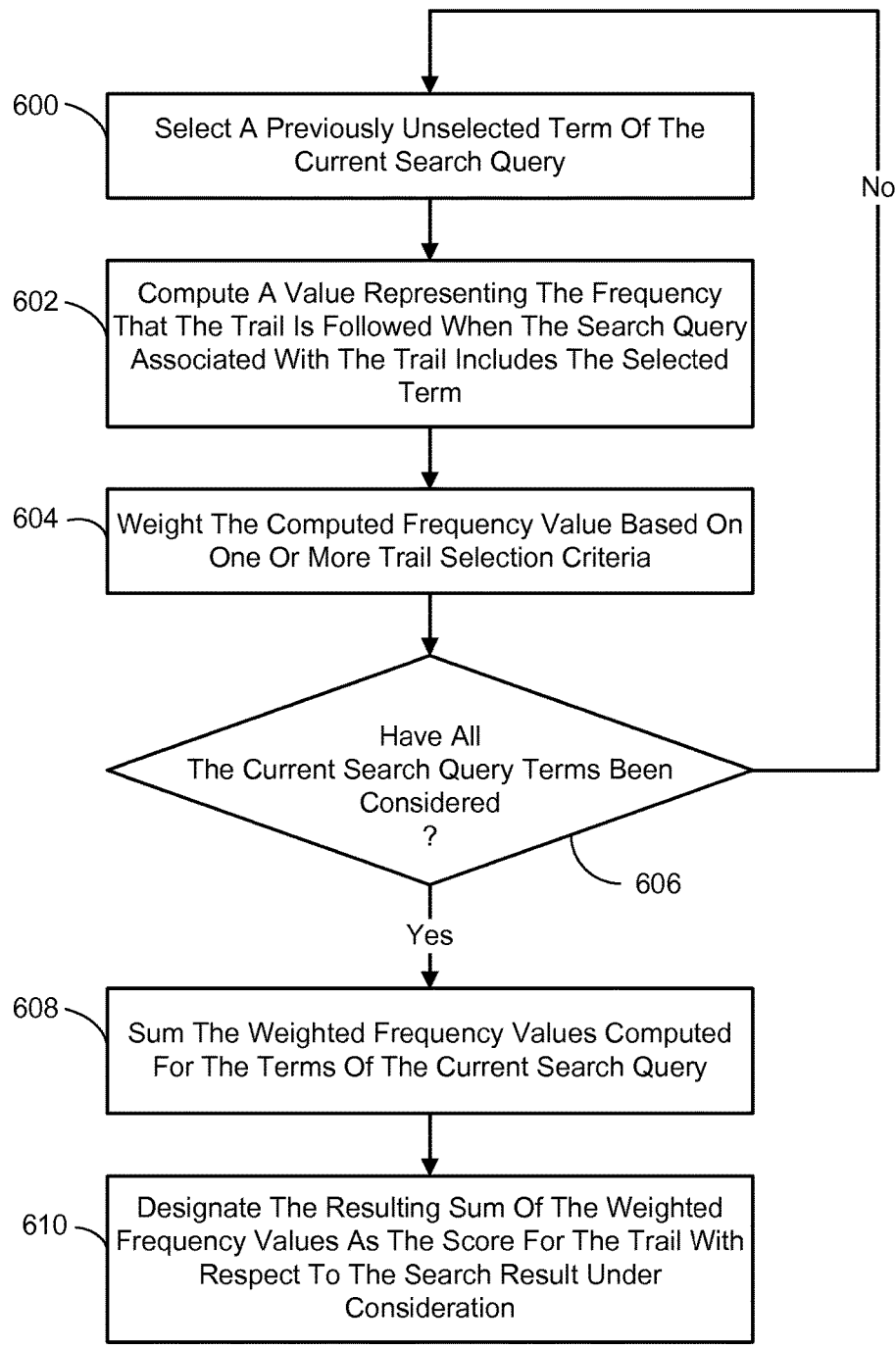
FIG. 6 is a flow diagram generally outlining an implementation of a part of the process of FIG. 5 involving trail scoring.

Referring now to FIG. 6, in one implementation the foregoing scoring of the trails is accomplished as follows. First, a previously unselected term of the current search query is selected (600). A value representing the frequency that the trail is followed when the search query associated with the trail includes the selected term is computed (602). This computed frequency value is weighted based on one or more of the previously described trail selection criteria (604). It is then determined if all the current search query terms have been considered (606). If not, then process actions 600 through 606 are repeated as shown in FIG. 6. If, however, all the query terms have been considered, then the weighted frequency values computed for the terms of the current search query are summed (608). The resulting value is then designated as the score for the trail with respect to the search result under consideration (610).

1.1.4 Matching Trails to a Query Only

As indicated previously, a search query can be presented directly to the trail scoring module and not provided to a search engine. In this embodiment, a trail or set of trails is matched to the search query independent of any search result URL. As such there is no dependence on the search engine to retrieve trail starting points.

In one embodiment, trails are matched to a search query and presented. More particularly, referring to FIG. 7, trails found within the previously described trail data are first accessed (700). Next, a current search query is input (702), and the trail or trails that match the current search query to a prescribed degree are identified (704). The identified trail or trails are then presented (706). Ways of presenting the trails either alone or in conjunction with standard search results will be described in the next section.

Trails are matched to search queries using an approach similar to the previous section. The only significant difference is that all trails beginning with the full query or the query terms are scored rather than only scoring those beginning with the query (or query terms) and the result (depicted as R in the previous subsection).

1.2 Presenting Trails

In addition to being used for establishing search results and navigation, search and/or browse trails can be presented on the SERP as an enhancement or alternative to existing result presentation strategies. One possible implementation of trail presentation on the SERP is found in FIG. 8, where a trail 802 is shown below a search result snippet 800. It is noted that while only one matching trail is shown, additional matching trails can be included as well.

Note that in FIG. 8, an implementation is shown where the URLs are connected with arrows to indicate their sequence order, beginning with one of the search results for the search query. The presentation of such rich information on the SERP may be confusing or overwhelming for users, especially if it is shown for all result URLs. Trails could be represented as a sequence of thumbnail images. Other presentation strategies are possible. For example, in another implementation, progressive revealment is employed where only the next step in the trail is visible at any point in time. This would involve showing only one step in the trail at a time on the interface, with the user having to explicitly request the next page if they are interested in seeing it. In yet another implementation, the trail or trails deemed to match a search result would be shown in a popup or drop-down window accessible through mouse click or hover on the search result snippet. In still another implementation, the trails matched to a search query can be presented as an instant answer at the top of the search result page above the search results provide for the query by a search engine, or as a replacement for the top-ranked search results (e.g., return the top-10 trails rather than the top-10 pages).

As well as presenting the search trails on the SERP, trails can also be presented elsewhere in a separate frame or in a toolbar/browser once the user has left the SERP. In various implementations, this form of presentation can be used to help the user in navigation so they can jump forward or backwards easily (like the back/forward buttons on the browser). These trails can also show the page the user is currently visiting in relation to the trail. In addition, these trails can also show one or more alternative paths the user can take, which could be the top N paths based on their scores. Still further, these trails can be shown alternatively as thumbnails.

Another comparison that can have significance is the relative path between two URLs. For example, navigating from "http://example.com/foo/bar/" to "http://example.com/foo/" may have significance to a user. In one implementation, these types of navigations can be presented differently in the interface to take up less space. For example, the symbol "/.." can be used to mean "up one level" so the above example would be abbreviated to "http://example.com/foo/bar/-->/.." when shown in the interface rather than "http://example.com/foo/bar/-->http://example.com/foo/". Or similarly, "/../zort" could mean "up one level then into the zort directory". This is an advantageous feature because many consecutive nodes in a trail are related in the foregoing manner.

2.0 The Computing Environment

A brief, general description of a suitable computing environment in which portions of the embodiments for establishing search results and deeplinks using search and browse trails described herein may be implemented will now be described. The embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 9:
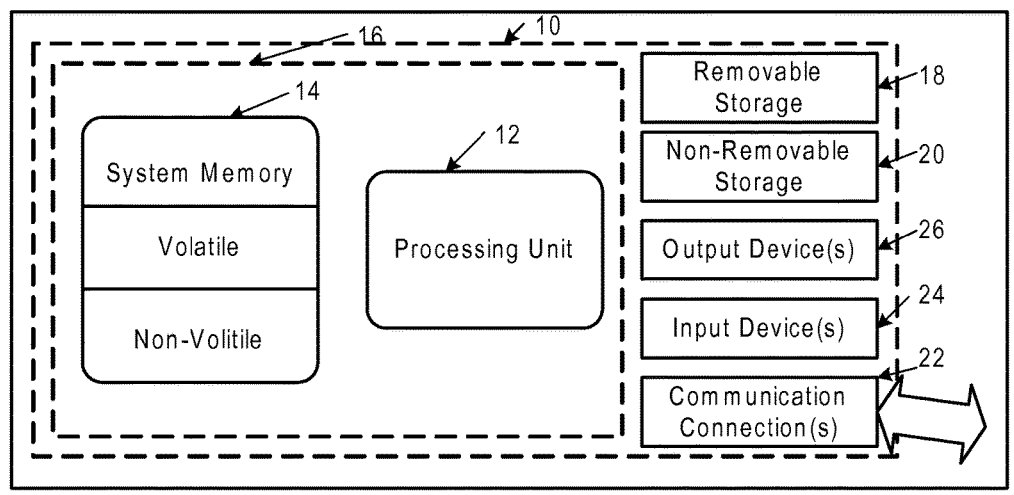
FIG. 9 is a diagram depicting a general purpose computing device constituting an exemplary system for implementing embodiments for establishing search results and deeplinks using search and browse trails described herein.

FIG. 9 illustrates an example of a suitable computing system environment. The computing system environment is only one example of a suitable computing environment and is not intended to suggest any limitation as to the scope of use or functionality of the embodiments described herein. Neither should the computing environment be interpreted as having any dependency or requirement relating to any one or combination of components illustrated in the exemplary operating environment. With reference to FIG. 9, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 9 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 9 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well known in the art and need not be discussed at length here.

The embodiments for establishing search results and deeplinks using search and browse trails described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for establishing search results based in part on search and browse trail data, said process comprising:
using a computer comprising a processing unit and a memory to perform the following process actions:
accessing trails found within said trail data, wherein each trail comprises a temporally-ordered sequence of URLs each of which was selected by a single prior user subsequent to selecting a search result presented in response to a prior search query;
identifying one or more trails that match a current search query to a prescribed degree, said identifying one or more trails comprising,
for each search result to the current search query, computing a score for each trail having a URL associated with the search result under consideration as its starting point, based on the frequency that the entire trail is followed by one or more prior users subsequent to selecting a search result presented in response to a prior search query as found within said trail data when a search query associated with the trail includes a term common to the current search query,
identifying those trails having a score that exceeds a prescribed score threshold up to a prescribed number of trails, and
designating the identified trails as matching the current search query;
employing the identified trail or trails to select one or more URLs found therein for inclusion in search results found by a search engine in response to the current search query; and
providing the search results including the one or more selected URLs as an output to be presented in response to the current search query.

2. The process of claim 1, wherein the process action of computing a score for each trail having a URL associated with the search result under consideration as its starting point, comprises the actions of:
for each term in the current search query,
computing a value representing the frequency that the trail under consideration is followed when the search query associated with the trail includes the term under consideration, and
weighting the computed frequency value based on one or more trail selection criteria;
summing the weighted frequency values computed for each term of the current search query; and
designating the summed weighted frequency values as the score for the trail under consideration with respect to the search result under consideration.

3. The process of claim 2, wherein the trail selection criteria comprises the frequency that the current search term under consideration is found in the search result under consideration, and at least one of:
trail length in terms of the number of sequential URLs comprising the trail; or
domain diversity in terms of the number of URLs comprising the trail that is outside the domain of the URL associated with the search result under consideration; or
trail strength in terms of the trail length and ease of navigation; or
trail breadth in terms of the number of branches from the first URL; or
trail depth in terms of the maximum number of nodes in a branch from the first URL; or
a number of URLs in the trail having the current search query in their title or URL string.

4. The process of claim 1, wherein the process action of employing the identified trail or trails to select one or more URLs found therein for inclusion in search results found by a search engine in response to the current search query, comprises the actions of:
selecting one or more URLs found in the identified trails to be included in the search results; and
adding the selected one or more URLs directly to the search results with an arbitrary rank.

5. The process of claim 4, wherein the process action of selecting one or more URLs found in the identified trails, comprises an action of selecting a trail URL whenever at least one of a number of inclusion factors exists, said inclusion factors comprising:
the trail URL exceeds a prescribed click count threshold, wherein the click count refers to the number of times a URL appears in the one or more identified trails; or
the trail URL is the first URL in the trail; or
the trail URL is the last URL in the trail; or
the trail URL is the URL in an identified trail on which the user associated with that trail spent the most time in comparison to the other URLs in that trail; or
the trail URL is a URL in an identified trail on which the user associated with that trail spent an amount of time equaling or exceeding a prescribed threshold.

6. The process of claim 4, wherein the process action of selecting one or more URLs found in the identified trails, comprises an action of selecting a trail URL whenever at least one of a number of inclusion factors exists, said inclusion factors comprising:
the trail URL in an identified trail is outside the domain of the first URL in that trail; or
the trail URL in an identified trail exhibits a depth which equals or exceeds a prescribed depth threshold; or
the trail URL in an identified trail exhibits a breadth which equals or exceeds a prescribed breadth threshold.

7. The process of claim 4, wherein the process action of selecting one or more URLs found in the identified trails, comprises an action of selecting only those URLs with a title or URL string, or both, which includes at least one term found in a search query associated with the trail that includes the URL.

8. The process of claim 1, wherein the process action of employing the identified trail or trails to select one or more URLs found therein for inclusion in search results found by a search engine in response to the current search query, comprises the actions of:
selecting one or more URLs found in the identified trails, wherein one or more of the selected URLs are to be potentially included in the search results; and
subjecting the selected URLs along with the search results to a re-ranking operation to produce revised search results that potentially include at least one of the selected URLs.

9. The process of claim 8, further comprising, prior to subjecting the selected URLs along with the search results to the re-ranking operation, performing a process action of adding the current search query to the title or URL string, or both, of the selected URLs.

10. The process of claim 8, wherein the process action of selecting one or more URLs found in the identified trails, comprises an action of selecting a trail URL whenever at least one of a number of inclusion factors exists, said inclusion factors comprising:
the trail URL exceeds a prescribed click count threshold, wherein the click count refers to the number of times a URL appears in the one or more identified trails; or
the trail URL is the first URL in the trail; or
the trail URL is the last URL in the trail; or
the trail URL is the URL in an identified trail on which the user associated with that trail spent the most time in comparison to the other URLs in that trail; or
the trail URL is a URL in an identified trail on which the user associated with that trail spent an amount of time equaling or exceeding a prescribed threshold.

11. The process of claim 8, wherein the process action of selecting one or more URLs found in the identified trails, comprises an action of selecting a trail URL whenever at least one of a number of inclusion factors exists, said inclusion factors comprising:
the trail URL in an identified trail is outside the domain of the first URL in that trail; or
the trail URL in an identified trail exhibits a depth which equals or exceeds a prescribed depth threshold; or
the trail URL in an identified trail exhibits a breadth which equals or exceeds a prescribed breadth threshold.

12. The process of claim 8, wherein the process action of selecting one or more URLs found in the identified trails, comprises an action of selecting only those URLs with a title or URL string, or both, which includes at least one term found in a search query associated with the trail that includes the URL.

13. A computer-implemented process for establishing a set of one or more deeplinks for a search result presented by a search engine using search and browse trail data, said process comprising:
using a computer comprising a processing unit and a memory to perform the following process actions:
accessing navigational trails within said search and browse data, wherein each navigational trail comprises a temporally-ordered sequence of URLs in the same domain which a single prior user visited, starting with a first navigational URL corresponding to said search result and ending at a destination URL, wherein a destination URL is a URL associated with a site where the prior user dwelled for more than a prescribed period of time;
computing a time to destination for each of the accessed navigational trails, wherein said time to destination is defined as the sum of an effective time the prior user associated with the navigational trail dwelled on each URL in the sequence of URLs preceding the destination URL;
computing a total time to destination for each group of navigational trails ending in the same destination URL, wherein said computing of the total time to destination for each group comprises computing the sum of the time to destination computed for each of the navigational trails making up the group;
establishing the set of deeplinks based on the computed total times to destination; and
providing the set of deeplinks as an output to be presented in response to a current search query.

14. The process of claim 13, wherein the process action of establishing the set of deeplinks based on the computed total times to destination, comprises an action of designating the destination URL of each of said groups of navigational trails as a deeplink whenever that group's total time to destination exceeds a prescribed deeplink threshold.

15. The process of claim 13, wherein the process action of establishing the set of deeplinks based on the computed total times to destination, comprises an action of designating as deeplinks a prescribed number of the destination URLs whose associated groups of navigational trails exhibit a higher total time to destination in comparison to the other groups of navigational trails.

16. The process of claim 13, wherein the process action of establishing the set of deeplinks based on the computed total times to destination, comprises an action of designating the destination URL of each of said groups of navigational trails as a deeplink whenever that group's total time to destination exceeds a prescribed deeplink threshold, up to a prescribed number.

17. The process of claim 13, wherein each navigational trail further comprises one or more intermediate destination URLs, wherein an intermediate destination URL is a URL associated with a site where the prior user dwelled for more than the prescribed period of time, and wherein the effective time of an intermediate destination URL is deemed to be said prescribed period of time for the purpose of computing the time to destination for the navigational trail which includes the intermediate destination URL.

18. The process of claim 13, wherein the process action of computing the total time to destination for each group of navigational trails further comprises an action of dividing the sum of the times to destination computed for each of the navigational trails in the group under consideration by the number of prior users who navigated via a plurality of URLs from the first navigational URL to the destination URL associated with the group, multiplied by the sum of the number of prior users who navigated via a plurality of URLs from the first navigational URL to the destination URL associated with the group and a number of prior users who employed a deeplink associated with said search result to reach the destination URL associated with the group.

19. A computer-implemented process for presenting search results based on search and browse trail data, said process comprising:

using a computer comprising a processing unit and a memory to perform the following process actions:

accessing trails found within said trail data, wherein each trail comprises a temporally-ordered sequence of URLs each of which was selected by a single prior user subsequent to selecting a search result presented in response to a prior search query;

inputting a current search query;

identifying one or more trails that match the current search query to a prescribed degree;

employing the identified trail or trails to select one or more URLs found therein for inclusion in search results found by a search engine in response to the current search query;

subjecting the selected URLs along with the search results to a re-ranking operation to produce combined revised search results that include at least one of the selected URLs; and presenting the combined revised search results in a single list as an output of the search engine for the current search query.

20. The process of claim 19, further comprising, prior to subjecting the selected URLs along with the search results to the re-ranking operation, performing a process action of adding the current search query to the title or URL string, or both, of the selected URLs.

* * * * *